United States Patent
Kikuzumi et al.

(10) Patent No.: US 9,368,822 B2
(45) Date of Patent: Jun. 14, 2016

(54) ELECTROLYTE MEMBRANE FOR SOLID POLYMER-TYPE FUEL CELL, METHOD FOR PRODUCING SAME, AND SOLID POLYMER-TYPE FUEL CELL

(75) Inventors: Shinya Kikuzumi, Osaka (JP); Masahiro Mori, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 276 days.

(21) Appl. No.: 14/240,784

(22) PCT Filed: Sep. 3, 2012

(86) PCT No.: PCT/JP2012/005550
§ 371 (c)(1),
(2), (4) Date: Feb. 25, 2014

(87) PCT Pub. No.: WO2013/051189
PCT Pub. Date: Apr. 11, 2013

(65) Prior Publication Data
US 2014/0242477 A1    Aug. 28, 2014

(30) Foreign Application Priority Data
Oct. 7, 2011   (JP) ................. 2011-222391

(51) Int. Cl.
*H01M 8/10*   (2006.01)
*H01M 2/16*   (2006.01)
(Continued)

(52) U.S. Cl.
CPC ........... *H01M 8/1041* (2013.01); *D04H 1/4318* (2013.01); *D04H 1/728* (2013.01); *H01B 1/122* (2013.01); *H01M 2/162* (2013.01);
(Continued)

(58) Field of Classification Search
CPC ..... D04H 1/4318; D04H 1/728; H01B 1/122; H01M 2/1606; H01M 2/162; H01M 2/1666; H01M 2/1686; H01M 8/0291; H01M 8/1023; H01M 8/1039; H01M 8/1041; H01M 8/1067; H01M 8/1081; H01M 2008/1095; H01M 2300/0088; Y02E 60/521; Y02P 70/56
See application file for complete search history.

(56) References Cited

U.S. PATENT DOCUMENTS 8,349,523 B2   1/2013   Kotera et al.
8,465,856 B2   6/2013   Yanagita et al.
(Continued)

FOREIGN PATENT DOCUMENTS

JP   2001-243964   9/2001
JP   2002-216800   8/2002
(Continued)

*Primary Examiner* — Scott J Chmielecki
(74) *Attorney, Agent, or Firm* — Hamre, Schumann, Mueller & Larson, P.C.

(57) ABSTRACT

An object of the present invention is to provide an electrolyte membrane that suppresses swelling and shrinkage caused by water retained in the electrolyte membrane for a solid polymer-type fuel cell, improves the durability of the electrolyte membrane, and obtains excellent power generation characteristics with a low resistance. The electrolyte membrane for a solid polymer-type fuel cell includes, as a reinforcing membrane, a nonwoven fabric composed of an electrolyte material and PVDF bicomponent fibers 2a, thereby improving the durability of the electrolyte membrane. Furthermore, the bicomponent fiber 2a has pores 23 that can effectively retain generated water, thereby improving battery performance under the condition of a low humidity.

8 Claims, 7 Drawing Sheets

(51) Int. Cl.
*D04H 1/4318* (2012.01)
*D04H 1/728* (2012.01)
*H01B 1/12* (2006.01)
*H01M 8/02* (2016.01)

(52) U.S. Cl.
CPC .......... *H01M2/1606* (2013.01); *H01M 2/1666* (2013.01); *H01M 2/1686* (2013.01); *H01M 8/0291* (2013.01); *H01M 8/1023* (2013.01); *H01M 8/1039* (2013.01); *H01M 8/1067* (2013.01); *H01M 8/1081* (2013.01); *H01M 2008/1095* (2013.01); *H01M 2300/0088* (2013.01); *Y02E 60/521* (2013.01); *Y02P 70/56* (2015.11)

(56) References Cited

U.S. PATENT DOCUMENTS

2006/0234097 A1  10/2006  Boehm et al.
2009/0239123 A1  9/2009  Kotera et al.
2009/0258274 A1  10/2009  Uensal et al.
2014/0120448 A1* 5/2014  Mori ................... H01M 8/1067
                                                              429/457

FOREIGN PATENT DOCUMENTS

| | | |
|---|---|---|
| JP | 2003-077494 | 3/2003 |
| JP | 2003-203648 | 7/2003 |
| JP | 2008-238134 | 10/2008 |
| JP | 2008238134 A * | 10/2008 |
| JP | 2009-245639 | 10/2009 |
| JP | 2009-248497 | 10/2009 |
| JP | 2009248497 A * | 10/2009 |
| JP | 2009-545841 | 12/2009 |
| JP | 2010-021126 | 1/2010 |
| JP | 2010021126 A * | 1/2010 |
| JP | 5163209 B | 3/2013 |
| WO | WO 2008/032449 | 3/2008 |

* cited by examiner

ELECTROLYTE MEMBRANE FOR SOLID POLYMER-TYPE FUEL CELL, METHOD FOR PRODUCING SAME, AND SOLID POLYMER-TYPE FUEL CELL

TECHNICAL FIELD

The present invention relates to an electrolyte membrane used for a solid polymer-type fuel cell.

BACKGROUND ART

A polymer electrolyte fuel cell (PEFC) includes a necessary number of stacked single cells, each including a catalyst layer bonded to an electrolyte membrane for a power generation reaction between separators. Fuel gas and oxidizer gas are supplied to the solid polymer-type fuel cell so as to electrochemically react through the electrolyte membrane, thereby simultaneously generating electric power, heat, and water.

The outer periphery of the electrolyte membrane is mainly supported by a resin frame to which a fixed seal called gasket is injection-molded so as to prevent leakage of the fuel gas. The electrolyte membrane fixed to the frame is sandwiched between the separators so as to form the single cell.

In recent years, the electrolyte membrane is a proton conductive ion exchange membrane. A positive ion-exchange membrane composed of a perfluorocarbon polymer having a sulfonic group is particularly excellent in basic properties and thus has been widely examined. Actually, a required electrolyte membrane for a solid polymer-type fuel cell has a low ohmic loss.

A solid polymer-type fuel cell has the following reactions:

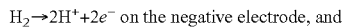

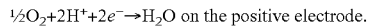

These reactions generate electrical energy. The electric resistance of a positive ion-exchange membrane is controlled by the mobility of protons in the positive ion-exchange membrane. The larger the water content in the positive ion-exchange membrane, the higher the mobility of protons. This reduces the electric resistance of the membrane. The positive pole is kept at a high water content because water is generated by the reaction, leading to high mobility of protons, whereas the negative electrode relatively has a low water content and thus it is assumed that the water content limits the mobility of protons of the ion-exchange membrane.

The electric resistance of the positive ion-exchange membrane is reduced by increasing the concentration of a sulfonic group and reducing the thickness of the membrane. However, a considerable increase in the concentration of a sulfonic group may reduce the mechanical strength of the membrane or cause the creep of the membrane during a long run of a fuel cell, disadvantageously reducing the durability of the fuel cell.

Moreover, an electrolyte membrane containing a high concentration of a sulfonic group considerably swells due to contained water and thus may cause various problems. The membrane dimensions are increased by steam or the like supplied with water generated during power generation or fuel gas. The increased dimensions of the membrane may cause "wrinkles" filling the grooves of separators so as to interfere with a gas flow.

Furthermore, repeatedly started and stopped operations cause the membrane to repeatedly swell and shrink. This may cause cracks on the membrane and electrodes joined to the membrane, leading to deterioration of battery characteristics.

As methods for solving the problems, the insertion of a reinforcement into an electrolyte membrane and the provision of films stacked with different water contents have been proposed (Patent Literatures 1 and 2).

In Patent Literature 1, an electrolyte membrane contains nonwoven fibers of a polyvinylidene fluoride polymer as a reinforcing material.

FIG. 9 is a schematic diagram of a conventional electrolyte membrane.

In FIG. 9, a fuel cell stack includes at least two films containing perfluorocarbon polymers with different water contents, and has a water easily containing structure in which a film 41 that increases in water content toward the negative electrode is located. This prevents a reduction in the mobility of protons on the negative electrode of a membrane and reduces an electric resistance. A film 42 having a low water content on the positive pole has the function of increasing the strength of the membrane (Patent Literature 2).

CITATION LIST

Patent Literatures

Patent Literature 1: Japanese Patent Laid-Open No. 2009-245639
Patent Literature 2: Japanese Patent Laid-Open No. 2001-243964

SUMMARY OF INVENTION

Technical Problem

In power generation in the configuration of Patent Literature 1, it is expected that a nonwoven fabric composed of fibers of fluorocarbon resin may suppress the swelling of the membrane as a reinforcement and suppress an excessive water content by means of the hydrophobicity of the fibers at a high humidity, whereas under the condition of a low humidity, the hydrophobicity of the fibers is assumed to hamper effective use of generated water.

Furthermore, the electrolyte membrane containing a fluorocarbon resin reinforcement membrane has a technical contradiction such that the proton conduction of the electrolyte membrane decreases that affects the power generation characteristics of a fuel cell.

The present invention has been devised in view of the problems. An object of the present invention is to provide an electrolyte membrane that has a low electric resistance and high mechanical strength even under the condition of a low humidity. Another object is to keep the characteristics of a fuel cell over a long period by means of a solid polymer-type fuel cell including the electrolyte membrane.

Solution to Problem

In order to attain the objects, an electrolyte membrane according to a first aspect of the present invention is an electrolyte membrane including a reinforcing membrane of a nonwoven fabric composed of bicomponent fibers and a first electrolyte material filling the voids of the reinforcing membrane, wherein the bicomponent fibers have a cross section structure that is a sea-island structure including fibers and a second electrolyte material filling the voids of the fibers, the second electrolyte material is a perfluorocarbon polymer having a sulfonic group, and the fibers are composed of one of a polyvinylidene fluoride polymer, a polyvinylfluoride polymer, a copolymer composed of multiple monomer units constituting a polymer selected from a polyvinylidene fluoride polymer and a polyvinylfluoride polymer, and a mixture of these polymers. Thus, sufficient proton conduction and membrane durability can be obtained.

An electrolyte membrane according to a second aspect of the present invention in an electrolyte membrane, in the first aspect, wherein the bicomponent fibers have an average fiber diameter of 0.01 μm to 1 μm. Thus, a nonwoven fabric can be fabricated with high porosity, achieving sufficient proton conduction and membrane durability.

An electrolyte membrane according to a third aspect of the present invention is an electrolyte membrane, in the first or second aspect, wherein the bicomponent fibers have pores. Thus, water generated in an operation of a fuel cell can be effectively used with proton conduction being obtained.

An electrolyte membrane according to a fourth aspect of the present invention is an electrolyte membrane, in one of the first to third aspects, wherein the first electrolyte material is a perfluorocarbon polymer. Thus, sufficient proton conductivity can be obtained.

An electrolyte membrane according to a fifth aspect of the present invention is an electrolyte membrane, in one of the first to third aspects, wherein the first electrolyte material may have an identical composition to the perfluorocarbon polymer constituting the reinforcing membrane or a different composition therefrom. The electrolyte material with a higher water content is filled so as to reduce the electric resistance of the electrolyte membrane, thereby improving the power generation characteristics of the fuel cell.

An electrolyte membrane according to a six aspect of the present invention is an electrolyte membrane, in one of the first to fifth aspects, wherein the outermost layer of at least one surface of the electrolyte membrane may have the exposed reinforcing membrane or may be covered with the perfluorocarbon polymer. The exposed reinforcing membrane increases the surface area of the electrolyte membrane and improves the power generation characteristics of the fuel cell.

A solid polymer-type fuel cell according to a seventh aspect of the present invention includes at least one stacked single cell including the electrolyte membrane for a solid polymer-type fuel cell according to one of the first to sixth aspects and a pair of separators disposed with the electrolyte membrane sandwiched between the separators. When the fuel cell is started or stopped, a membrane electrode joint swells or shrinks but the reinforcing membrane in the electrolyte membrane allows resistance to fatigue of swelling and shrinkage, achieving a fuel cell with high durability. Furthermore, the bicomponent fibers of the reinforcing membrane contain pores that retain water. Thus, the fuel cell can have high conductivity under the condition of a low humidity or at the restart and smoothly start power.

A method for producing an electrolyte membrane for a solid polymer-type fuel cell according to the present invention includes the steps of: forming a reinforcing membrane of a nonwoven fabric by extending bicomponent fibers into a wavy shape, the bicomponent fibers being fabricated by spinning, by electrospinning, a mixed solution of a second electrolyte material, a polyvinylidene fluoride polymer (hereinafter, will be called PVDF), a polyvinylfluoride polymer (hereinafter, will be called PVF), a copolymer composed of multiple monomer units constituting a polymer selected from PVDF and PVF, a mixture of these polymers, and a solvent; and filling voids in the reinforcing membrane with a first electrolyte material. Specifically, the first electrolyte material and the second electrolyte material are perfluorocarbon polymers having sulfonic groups. The nonwoven fabric contained in the electrolyte membrane is fabricated by electrospinning, achieving the bicomponent fibers of a sulfonic-acid perfluorocarbon polymer and PVDF. The fiber diameter and the mass per unit area can be easily controlled, achieving sufficient proton conduction and membrane durability.

Advantageous Effects of Invention

This configuration can reduce membrane deterioration caused by a dimensional change of an electrolyte membrane retaining water, improve the durability of the electrolyte membrane, and ensure the characteristics of a fuel cell for a long period without reducing proton conduction even when the electrolyte membrane is under the condition of a low humidity.

DESCRIPTION OF EMBODIMENT

Referring to FIGS. 1 to 8, an embodiment of the present invention will be described below.

Figure 1:
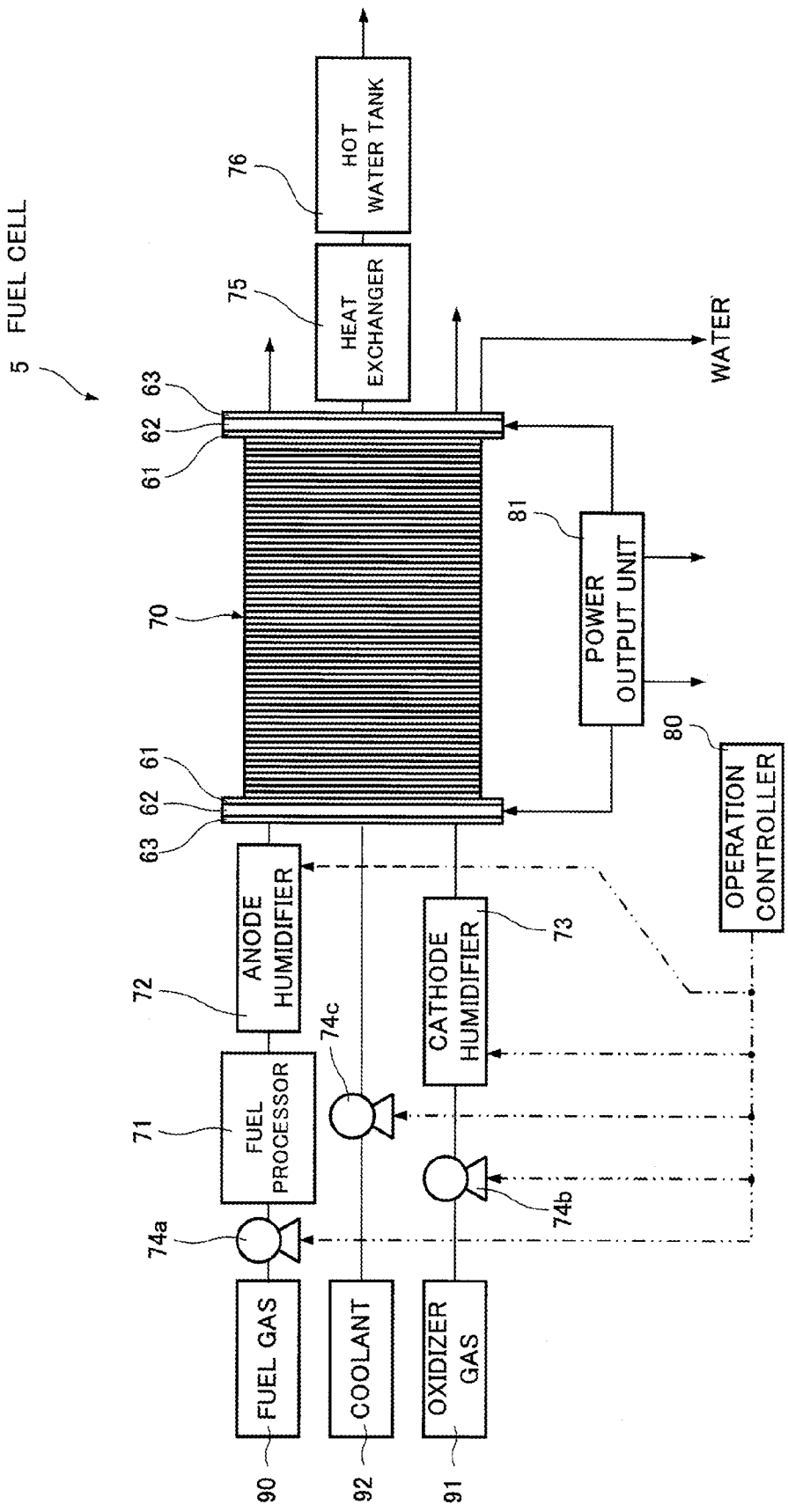
FIG. 1 is a schematic diagram of a fuel cell according to an embodiment.

FIG. 1 is a schematic structural diagram of a solid polymer-type fuel cell according to the present invention.

For example, a fuel cell 5 causes fuel gas 90 containing hydrogen to electrochemically react with air or oxidizer gas 91 containing oxygen, thereby generating electric power, heat, and water at the same time. The fuel cell 5 includes a stack 70 having a laminated structure in which a plurality of single cells are connected in series, the single cell including a pair of electrodes, that is, an anode and a cathode, a fuel processor 71 that collects hydrogen from the fuel gas 90, an anode humidifier 72 that improves power generation efficiency by humidifying the fuel gas containing hydrogen collected by the fuel processor 71, a cathode humidifier 73 that humidifies the oxidizer gas 91, and pumps 74a and 74b for the supply of the fuel gas 90 and the oxidizer gas 91.

Figure 2:
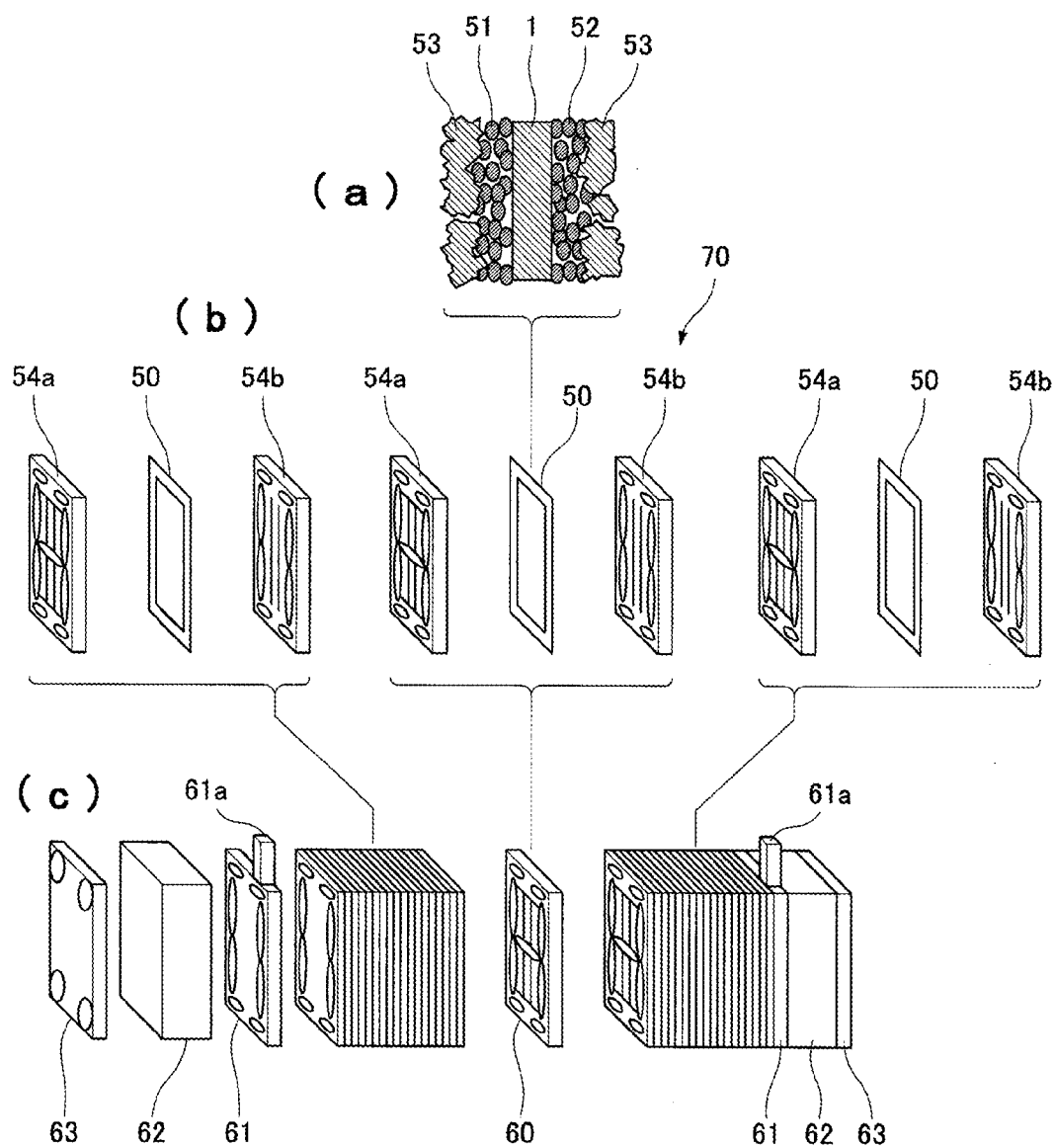
FIG. 2 is a schematic diagram of a stack according to the present embodiment.

FIG. 2 is a Schematic exploded view of the stack 70.

For the stack 70, a fuel supply system including the fuel processor 71, the anode humidifier 72, and the pump 74a is provided for supplying the fuel gas 90 to the single cells. Moreover, the cathode humidifier 73 and the pump 74b constitute an oxidizer supply system that supplies oxidizer gas to the single cells of the stack 70.

The fuel supply system and the oxidizer supply system may have other various forms as long as the systems have the function of supplying fuel and an oxidizer. In the present embodiment, the effect of the present embodiment can be satisfactorily obtained as long as the supply of the fuel gas 90 and the oxidizer gas 91 is shared by the single cells provided in the stack 70.

The fuel cell 5 further includes a pump 74*c* that supplies a circulating coolant 92 for efficiently removing heat generated in the stack 70 during power generation, a heat exchanger 75 that exchanges heat removed by the coolant (e.g., a liquid such as pure water not exhibiting conductivity) with a fluid such as tap water, and a hot water tank 76 that stores tap water after heat exchange. The fuel cell 5 further includes an operation controller 80 that controls operations for power generation with these components associated with another, and a power output unit 81 that collects electric power generated in the stack 70.

As shown in FIG. 2(*c*), the stack 70 includes a plurality of stacked single cells 60, the single cell 60 being sandwiched between current collectors 61, insulating plates 62, and end plates 63 from two sides with a predetermined load. The current collector 61 has a current collecting terminal 61*a* from which current, that is, electric power is collected during power generation.

The insulating plate 62 for insulation between the current collector 61 and the end plate 63 may have an inlet or an outlet of gas or a coolant (not shown). The end plates 63 fasten and hold the stacked single cells 60, the current collectors 61, and the insulating plates 62 by means of a pressing member (not shown) with a predetermined load.

As shown in FIG. 2(*b*), the single cell 60 includes a membrane electrode joint 50 sandwiched between a pair of separators 54*a* and 54*b*. The separators 54*a* and 54*b* may be made of conductive materials impermeable to gas. For example, generally, resin impregnated carbon materials are cut into predetermined shapes or a mixture of carbon powder and a resin material is molded.

The separators 54*a* and 54*b* are partially in contact with the membrane electrode joint 50 and the contact portions of the separators 54*a* and 54*b* have recessed grooves in contact with gas diffusion layers 53. Thus, gas passages for supplying fuel gas or oxidizer gas and removing excessive gas are formed on electrode surfaces. The gas diffusion layer 53 may typically contain carbon fibers as a base material. The base material may be, for example, woven fabric carbon.

As shown in FIG. 2(*a*), the membrane electrode joint 50 has an anode-side catalyst layer 51 on the anode surface of an electrolyte membrane 1 and a cathode-side catalyst layer 52 on the cathode surface of the electrolyte membrane 1. The anode-side catalyst layer 51 is predominantly composed of carbon powder on a platinum-ruthenium alloy catalyst while the cathode-side catalyst layer 52 is predominantly composed of carbon powder on a platinum catalyst. On the outer surfaces of the anode-side catalyst layer 51 and the cathode-side catalyst layer 52, the gas diffusion layers 53 are disposed with electronic conductivity and permeability to fuel gas or oxidizer gas.

Figure 3:
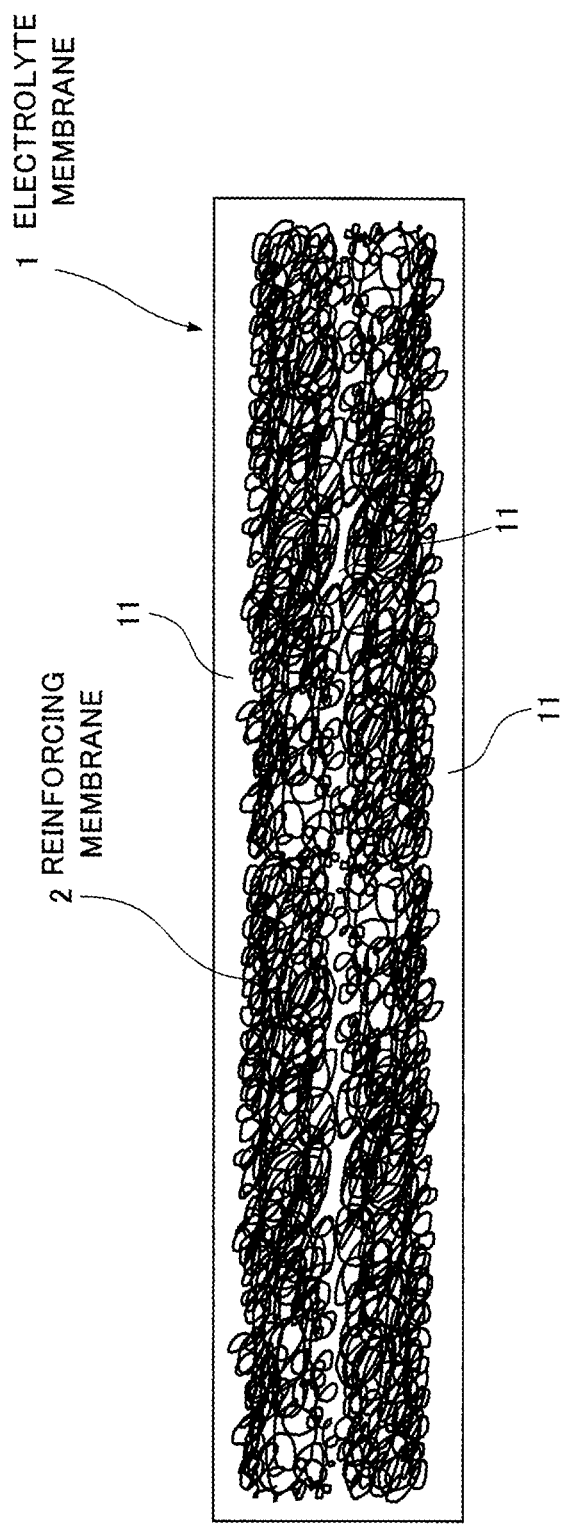
FIG. 3 is a schematic diagram showing a cross section of an electrolyte membrane according to the present embodiment.

The electrolyte membrane 1 is composed of bicomponent fibers of a perfluorocarbon polymer having a sulfonic group (hereinafter, will be called a sulfonic-acid perfluorocarbon polymer) and a polyvinylidene fluoride polymer (hereinafter, will be called PVDF) and an electrolyte material filling the voids of the bicomponent fibers. FIG. 3 is a schematic diagram of the cross section of the electrolyte membrane 1.

Figure 4:
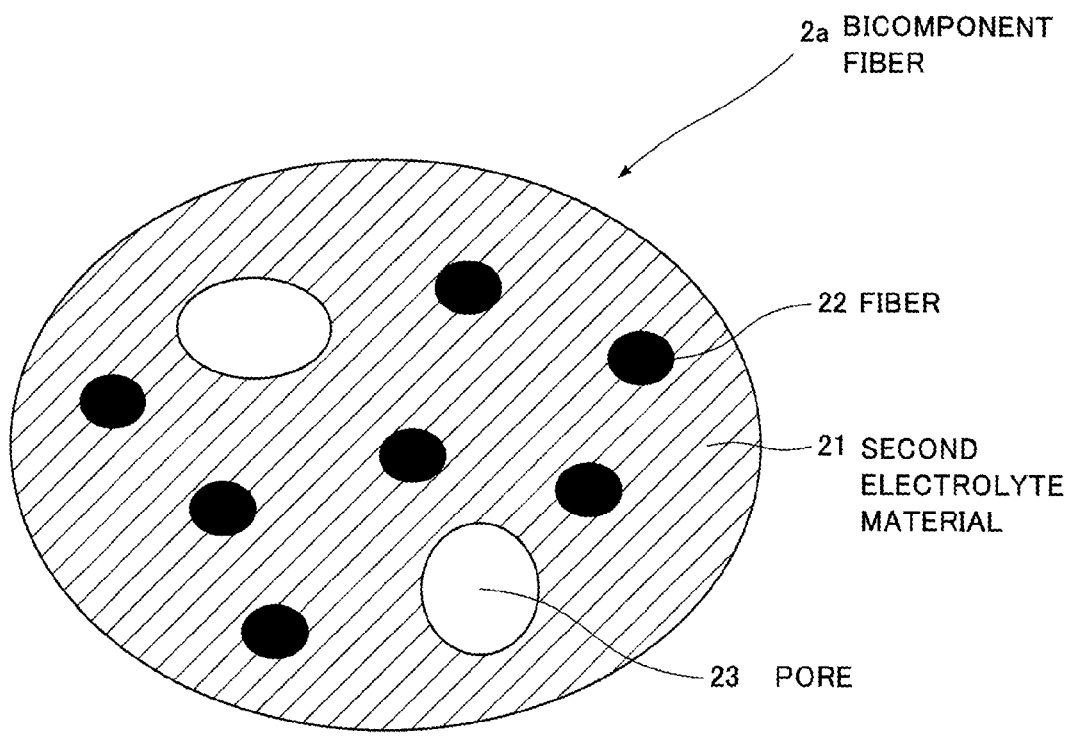
FIG. 4 is a schematic diagram showing a cross section of a bicomponent fiber according to the present embodiment.

The electrolyte membrane 1 contains a reinforcing membrane 2 that is a nonwoven fabric. The voids of the reinforcing membrane 2 are filled with a first electrolyte material 11. FIG. 4 is a schematic diagram of the cross section of a bicomponent fiber 2*a* forming the reinforcing membrane 2.

The bicomponent fiber 2*a* includes a second electrolyte material 21, PVDF fibers 22, and pores 23. The fibers 22 are contained in the second electrolyte material 21 so as to extend in the longitudinal direction of the bicomponent fiber 2*a*. The pores 23 contained in the bicomponent fiber 2*a* may extend in the longitudinal direction of the bicomponent fiber 2*a*.

Specifically, as shown in FIG. 4, the bicomponent fiber 2*a* has a structure (sea-island structure) in which the "island component of the sea-island structure" of the fibers 22 floats in the "sea component of the sea-island structure" of the second electrolyte Material 21. Moreover, the pores 23 are formed in the "sea component of the sea-island structure" of the second electrolyte material 21. In this case, the second electrolyte material 21 is a sulfonic-acid perfluorocarbon polymer.

Since the PVDF fibers 22 have higher peel strength than the second electrolyte material 21 that is a sulfonic-acid perfluorocarbon polymer, the reinforcing membrane 2 acts as a reinforcement of the electrolyte membrane 1. This can regulate swelling caused by retained water and suppress deterioration of the membrane, leading to higher durability.

In the electrolyte membrane 1, some sulfonic groups of a sulfonic-acid perfluorocarbon polymer coagulate into an inverted micelle structure that collects water. The hydrogen ions of the sulfonic groups are dissociated into a charged element that exhibits conductivity through an inverted micelle portion. The higher the water content of the electrolyte membrane, the higher the mobility of protons. It is assumed that the pores 23 in the bicomponent fiber 2*a* retain water generated during an operation of the fuel cell and obtain high proton conduction particularly under the condition of a low humidity. The electrolyte membrane 1 of the present embodiment effectively resolves a technical contradiction between improvement in strength and improvement in conductivity.

The bicomponent fiber 2*a* was fabricated by electrospinning. The bicomponent fiber 2*a* is folded into a wavy shape. The bicomponent fiber 2*a* desirably has an average fiber diameter of 0.01 μm to 1 μm. If the fiber diameter is smaller than 0.01 μm, the content of the fibers 22 acting as reinforcing materials of the electrolyte membrane 1 decreases, preventing suppression of a dimensional change caused by the swelling of the electrolyte membrane 1. If the fiber diameter is larger than 1 μm, the content of the fibers 22 in the reinforcing membrane 2 increases. This prevents protons from propagating through the electrolyte membrane 1, leading to deterioration of the power generation characteristics of the fuel cell.

The electrolyte membrane 1 containing the bicomponent fibers 2*a* can generate electric power as a fuel cell such that protons propagate the second electrolyte material 21 in the bicomponent fiber 2*a* and the first electrolyte material 11 filling the voids of the reinforcing membrane 2.

The second electrolyte material 21 of the bicomponent fiber 2*a* and the first electrolyte material 11 filling the voids of the reinforcing membrane 2 including the bicomponent fiber 2*a* are sulfonic-acid perfluorocarbon polymers. The first electrolyte material 11 and the second electrolyte material 21 may be different materials.

The outermost layer of at least one surface of the electrolyte membrane 1 may have the exposed reinforcing membrane 2 or may be covered with the first electrolyte material 11. The exposed reinforcing membrane 2 increases the surface area of the electrolyte membrane and improves the power generation characteristics of the fuel cell.

Since the electrolyte membrane 1 reaches up to 80° C. in an operation of the fuel cell, the fibers 22 are preferably made of PVDF as a material of the electrolyte membrane 1 in consideration of sufficient heat resistance in the temperature range of the electrolyte membrane 1 and the fabrication of nonwoven fibers of a chemically stable material by electrospinning.

The fibers 22 may be made of, instead of PVDF, a copolymer composed of multiple monomer units constituting a polymer selected from PVDF and PVF, for example, a polyvinylfluoride polymer (hereinafter, will be called PVF) or a mixture of these polymers. Materials having heat resistance and chemical resistance in electrospinning are preferably used. Furthermore, hydrophobic materials are more preferable. Nonwoven fibers made of a hydrophobic material are provided in the electrolyte membrane 1 and thus can drain unnecessary water generated in the electrolyte membrane 1 by power generation, thereby reducing unnecessary swelling caused by the generated water.

In the present embodiment, in order to reduce a dimensional change caused by swelling and shrinkage of the electrolyte membrane 1, excellent mechanical properties such as tensile strength and elongation are desired. An extremely low molecular weight reduces mechanical strength while an extremely high molecular weight reduces solubility and makes it difficult to make a solution. Thus, a desirable molecular weight of the used PVDF is 150000 to 550000.

In the present embodiment, in order to obtain bicomponent fibers of the second electrolyte material 21 and the PVDF fibers 22 by electrospinning, an electrolyte material and PVDF may be dissolved into a solution with dimethylacetamide (hereinafter, will be called DMAc) used as a solvent. The solvent may be dimethyl sulfoxide, dimethylformamide, or acetone. The use of a polarized solvent increases solubility. A desirable solution concentration is 10% to 25%. A low solution concentration does not lead to a sufficient fiber diameter. This cannot suppress a dimensional change caused by swelling and shrinkage of the electrolyte membrane 1. A high solution concentration does not lead to a sufficient electrostatic explosion in the fabrication of the bicomponent fibers by electrospinning and thus the fibers cannot be obtained.

Figure 5:
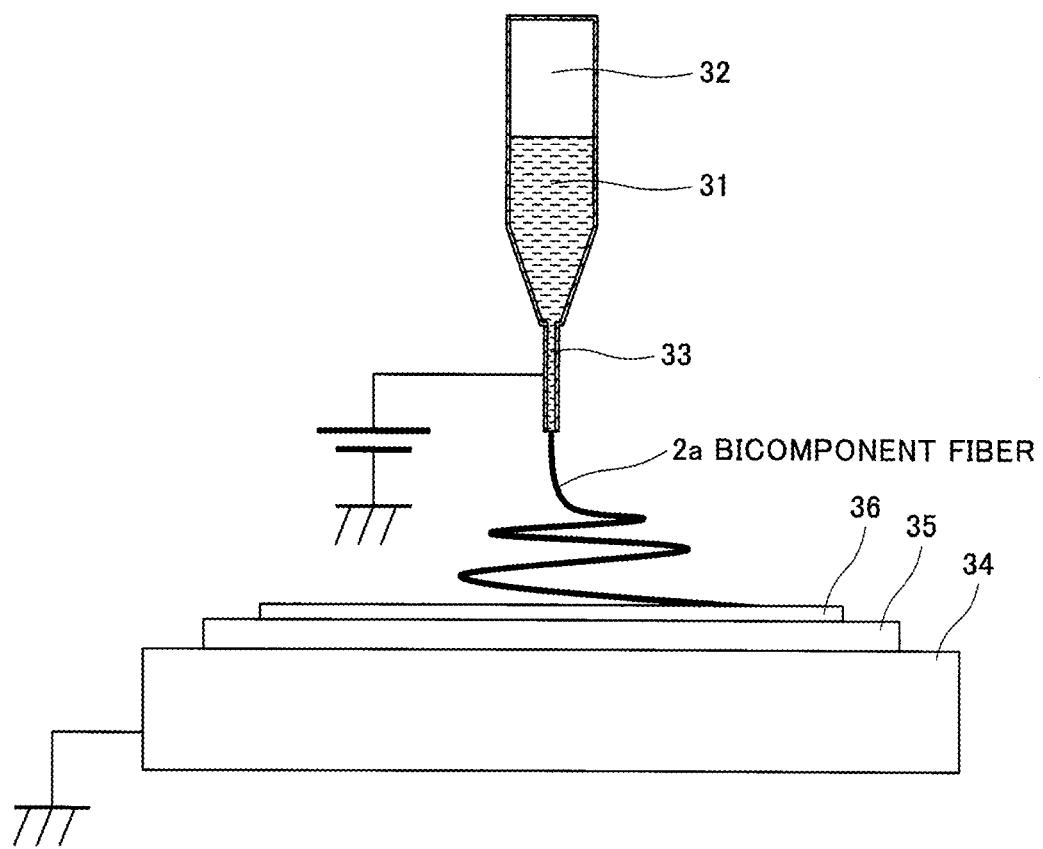
FIG. 5 is a schematic diagram of a system for fabricating the bicomponent fibers according to the present embodiment.

FIG. 5 is a schematic diagram of a system for fabricating the bicomponent fibers 2a into a nonwoven fabric 36 to be processed into the reinforcing membrane 2 later.

In the present embodiment, when the bicomponent fibers of the electrolyte material and PVDF are fabricated by electrospinning, a mixed solution 31 of PVDF, the electrolyte material, and a solvent was put into a syringe 32 with a needle-like nozzle 33 acting as a solution discharging nozzle. The nozzle desirably has an inside diameter of 0.18 mm to 0.42 mm. If the nozzle has a small inside diameter, the amount of the discharged solution decreases, leading to lower productivity. If the nozzle has a large inside diameter, the amount of the discharged solution increases. This does not lead to a proper electrostatic explosion and thus the fibers are not fabricated. In the present embodiment, an air pulse dispenser (not shown) may be used for discharging a solution. A feeding pressure is desirably 10 kPa to 50 kPa. A low feeding pressure prevents sufficient discharge of the mixed solution 31 of PVDF, the electrolyte material, and the solvent, resulting in low productivity. In contrast, a high feeding pressure increases the amount of discharge. This does not lead to a proper electrostatic explosion and thus the fibers are not fabricated. The amount of discharge fluctuates with the viscosity of a solution. Thus, the feeding pressure may be controlled so as to have a proper discharge amount such that the feeding pressure increases at a high viscosity while the feeding pressure decreases at a low viscosity.

In the present embodiment, a PET substrate 35 was placed on a collector 34, a voltage was applied to the nozzle 33, and then the collector 34 for collecting fibers was connected to a ground. The mixed solution 31 was discharged from the nozzle 33 in relative displacement of the syringe 32 and the collector 34. The bicomponent fibers 2a discharged from the nozzle 33 were spread like waves on the flat PET substrate 35 to form the nonwoven fabric 36.

An electric field between the nozzle 33 and the collector 34 is desirably set at 10 kV to 50 kV. A weak electric field does not lead to a sufficient electrostatic explosion and thus suitable fibers having an average fiber diameter of 0.01 μm to 1 μm cannot be obtained. Furthermore, a strong electric field shortens a time period from the discharge of the mixed solution 31 of PVDF, the electrolyte material, and the solvent discharged from the nozzle 33 to the arrival of the mixed solution 31 at the collector 34. This does not lead to a sufficient electrostatic explosion and thus suitable fibers having an average fiber diameter of 0.01 μm to 1 μm cannot be obtained. In the present embodiment, a positive voltage was applied to the nozzle 33. However, the application of a negative charge is more preferable depending upon the material of nonwoven fibers. The polarity of applied voltage may be selected depending upon the material.

A distance between the end of the nozzle 33 and the collector 34 is desirably 90 mm to 160 mm. A short distance between the end of the nozzle 33 and the collector 34 shortens a time period from the discharge of the mixed solution 31 of PVDF, the electrolyte material, and the solvent discharged from the nozzle to the arrival of the mixed solution 31 at the collector 34. This does not lead to a sufficient electrostatic explosion and thus suitable fibers having an average fiber diameter of 0.01 μm to 1 μm cannot be obtained.

The electrostatic explosion is affected by the viscosity and amount of a solution. When nonwoven fibers are generated on the collector 34, an applied voltage and a distance between the nozzle 33 and the collector 34 can be optimally determined according to the degree of drying of the solvent of the solution. If the solvent of nonwoven fibers generated on the collector 34 is not sufficiently dried but is kept in a humid state, the electrostatic explosion is insufficient. Thus, the amount of discharge from the nozzle 33 may be reduced to a proper amount of discharge. Moreover, a suitable electrostatic explosion is likely to occur also when the distance between the nozzle 33 and the collector 34 increases. If the amount of discharge cannot be reduced to obtain high productivity, the distance between the nozzle 33 and the collector 34 may be increased.

A small discharge amount or a large distance between the nozzle 33 and the collector 34 may cause an excessive electrostatic explosion, forming nonwoven fibers more widely than a predetermined region. Thus, it takes a long time to form nonwoven fibers with a necessary thickness, resulting in low productivity.

A plurality of nozzles (not shown) may be used to improve productivity. A desirable distance between the nozzles is at least 10 mm. In the case of a short distance between the nozzles, the charges of the adjacent nozzles and the charged mixed solution 31 of PVDF, the electrolyte material, and the solvent interact. This does not lead to a sufficient electrostatic explosion, preventing the formation of proper fibers with an average fiber diameter of 0.01 μm to 1 μm.

Figure 6:
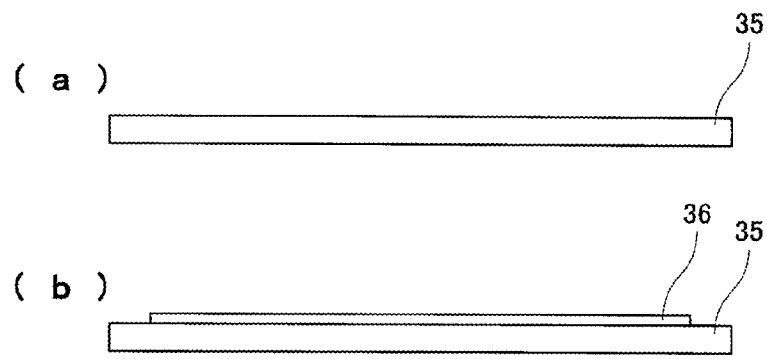
FIG. 6 is a process schematic diagram of the fabrication of the bicomponent fibers according to the present embodiment.

FIG. 6 is a process schematic diagram of the fabrication of the bicomponent fibers.

In the present embodiment, the nonwoven fabric 36 composed of the bicomponent fibers 2a is formed on the PET substrate 35 by electrospinning. The obtained nonwoven fabric 36 undergoes annealing so as to crystallize an electrolyte. The crystallized electrolyte can improve durability. The temperature of annealing is desirably at least 10° C. higher than the glass transition temperature of the electrolyte material. A short annealing time does not lead to sufficient crystallization while a long annealing time causes excessive crystallization, thus resulting in low proton conduction. In the present embodiment, annealing is also performed after the application of an electrolyte solution 37 in a downstream process. Thus, the processing time of the process may be added to the annealing time before adjustment. The nonwoven fabric 36 is used as the reinforcing membrane 2.

Figure 7:
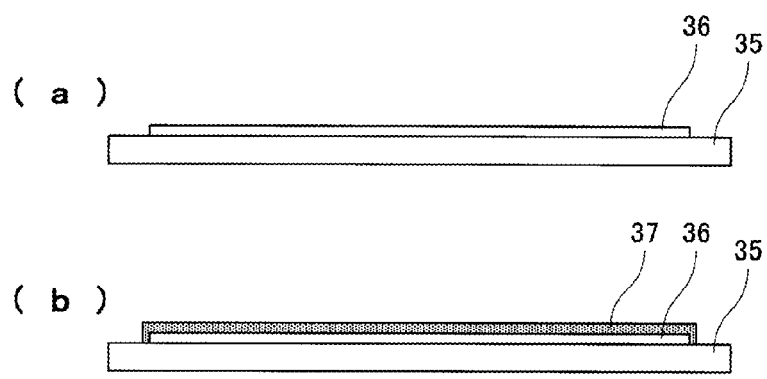
FIG. 7 is a process schematic diagram showing the coating of an electrolytic material in the electrolyte membrane according to the present embodiment.

FIG. 7 is a schematic diagram showing the coating process of the electrolytic solution 37 according to the present embodiment. In the present embodiment, the nonwoven fabric 36 composed of bicomponent fibers obtained on the PET substrate 35 was impregnated with the electrolytic solution 37. In the present embodiment, the electrolytic solution 37 may be coated by a bar coater (not shown) to the nonwoven fabric 36 composed of bicomponent fibers. The electrolytic solution 37 may be coated with a slit die or may be printed or sprayed as long as the nonwoven fabric 36 composed of bicomponent fibers with high porosity is fully impregnated with the electrolytic solution 37. In the present embodiment, the solvent is volatilized and the solution is dried after the electrolytic solution 37 is coated. The electrolytic solution 37 in the present embodiment is coated such that the dried electrolyte membrane 1 has a predetermined thickness.

The coated electrolytic solution 37 is dried and then is annealed to crystallize the electrolyte. The annealing temperature is desirably at least 10° C. higher than the glass transition temperature of the electrolyte material. A low annealing temperature does not lead to sufficient crystallization and thus the electrolyte membrane 1 is not sufficiently durable. The annealing time desirably ranges from 30 minutes to 2 hours. A short annealing time does not lead to sufficient crystallization while a long annealing time causes excessive crystallization, thus resulting in low proton conduction.

In the present embodiment, the PET substrate 35 is peeled off after annealing, and then the nonwoven fabric 36 is used as the electrolyte membrane 1.

Figure 8:
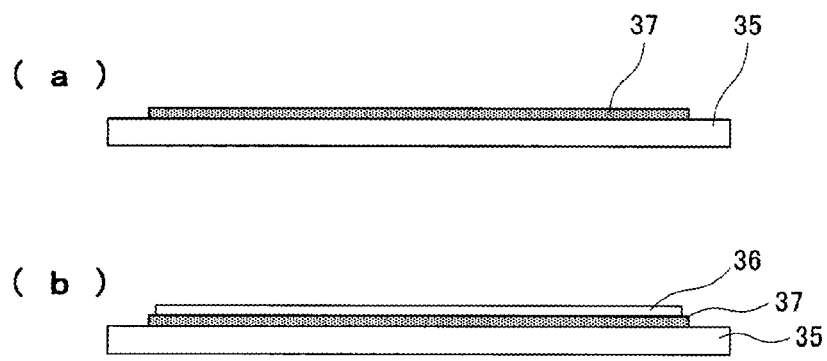
FIG. 8 is another process schematic diagram showing the coating of the electrolytic material in the electrolyte membrane according to the present embodiment.
Figure 9:
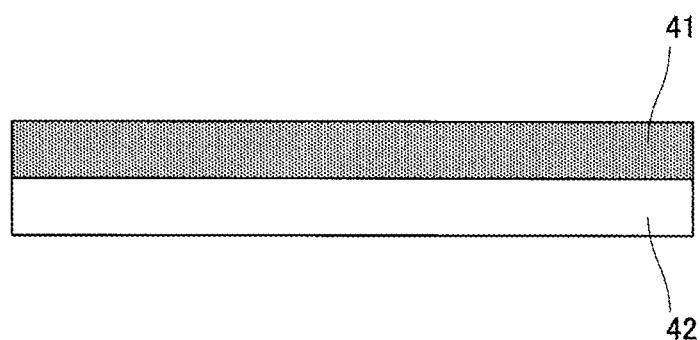
FIG. 9 is a schematic diagram showing a conventional solid-polymer electrolyte membrane.

FIG. 8 is another process schematic diagram showing the coating of the electrolytic solution 37 according to the present embodiment. In the present embodiment, as shown in FIG. 8, the electrolytic solution 37 may be coated beforehand to the PET substrate 35, the nonwoven fabric 36 composed of bicomponent fibers may be formed thereon by electrospinning, and then the electrolytic solution 37 may be coated such that the voids of the bicomponent fibers are filled with the electrolytic solution 37. Without peeling the electrolyte membrane from the PET substrate 35, the nonwoven fabric 36 composed of bicomponent fibers can be located at the center of the electrolyte membrane relative to the thickness direction of the electrolyte membrane, thereby simplifying the process.

After the electrolytic solution 37 is coated to the PET substrate 35, the nonwoven fabric 36 composed of bicomponent fibers is formed thereon. At this point, the nonwoven fabric 36 composed of bicomponent fibers may be formed on the dried electrolytic solution 37 or the nonwoven fabric 36 composed of bicomponent fibers may be formed on the undried electrolytic solution 37. If the nonwoven fabric 36 composed of bicomponent fibers is formed on the undried electrolytic solution 37, the formed bicomponent fibers are impregnated with the electrolytic solution 37 coated beforehand, forming the reinforcing membrane 2.

The present invention can efficiently produce bicomponent fibers used for reinforcement, achieving an electrolyte membrane with low resistance. A membrane electrode joint is obtained using the electrolyte membrane, achieving a solid polymer-type fuel cell having excellent electrical characteristics particularly under the condition of a low humidity.

The contained reinforcing membrane leads to high mechanical strength even with a small thickness and high dimensional stability when water is retained. Thus, higher durability can be expected.

Embodiment

Fabrication of a Bicomponent Fiber Material

Pellets of PVDF (ARKEMA K.K., a molecular weight of 275000) were agitated by a rotary mixer and then were dissolved into DMAc. A Nafion solution (SE-20092 manufactured by DuPont) was added as an electrolyte material and then was agitated into a mixed solution by the rotary mixer. The mixing ratio of PVDF, Nafion, and DMAc was 1:1:8 in a weight ratio.

[Fabrication of Bicomponent Fibers]

Bicomponent fiber production equipment (model number: NF101, manufactured by Panasonic Factory Solutions Co., Ltd.) was prepared for electrospinning. A stainless nozzle of 28 G an inside diameter of 0.18 mm, an outside diameter of 036 mm, a nozzle length of 15 mm) was attached to the end of a disposable syringe having a volume of 10 mL. Bicomponent fibers were fabricated with a distance from a collector to the nozzle of 120 mm, a voltage applied between the collector and the nozzle of 15 kV, and a feeding pressure of 30 kPa. After that, the bicomponent fibers were dried and burned at 120° C. for 60 minutes. The fiber diameter of the bicomponent fibers fabricated on the collector ranged from 200 nm to 500 nm and the average fiber diameter was 300 nm.

[Method for Forming an Electrolyte Membrane]

A Nafion solution (SE-20092 manufactured by DuPont) was used as an electrolytic solution. Nonwoven fibers were impregnated with the electrolytic solution by means of a bar coater. The nonwoven fibers were impregnated with a proper volume of the electrolytic solution such that the fibers have a thickness of 30 μm after drying and burning. The fibers were dried and burned at 120° C. for one hour.

[Method for Measuring Proton Conduction]

A measuring device for proton conduction (chemical impedance meter 3532-80, manufactured by HIOKI E.E. CORPORATION) was prepared to conduct measurement by the four-terminal method. A sample had a width of 10 mm and a length of 70 mm. For comparison, a bulk membrane of a Nation solution (SE-20092 manufactured by DuPont) was fabricated and measured. The measurement result was shown in (Table 1) below:

TABLE 1

| | Proton conduction measurement results | | | |
|---|---|---|---|---|
| | 35% RH | 55% RH | 75% RH | 95% RH |
| Membrane of embodiment | 0.08 | 0.085 | 0.09 | 0.17 |
| Nafion bulk membrane (SE-20092) S/cm@80° C. | 0.03 | 0.05 | 0.09 | 0.18 |

At a high humidity of at least 75% RH, the measurement results of the membrane of the embodiment and the Nafion bulk membrane (SE-20092) were hardly different from each other, whereas at a low humidity of 55% RH or less, the proton conduction was 2.7 times (35% RH) and 1.7 times (55% RH) that of the Nafion bulk membrane (SE-20092). It is assumed that high proton conduction was obtained at a low humidity because water generated by an operation was retained in pores in the bicomponent fibers.

INDUSTRIAL APPLICABILITY

An electrolyte membrane according to the present invention is industrially available over a wide range as a solid polymer-type fuel cell having excellent electrical characteristics particularly under the condition of a low humidity. The features of the solid polymer-type fuel cell are operability at low temperatures, a high output current density, and a small size. The solid polymer-type fuel cell is regarded as promising in the use of a home cogeneration system, a fuel cell vehicle, and a base station of mobile communications.

1 electrolyte membrane
2 reinforcing membrane
2a bicomponent fiber
5 fuel cell
11 first electrolyte material
21 second electrolyte material
22 fiber
23 pore
31 mixed solution of PVDF, electrolyte material, and solvent
32 syringe
33 nozzle
34 collector
35 PET substrate
36 nonwoven fabric composed of bicomponent fibers
37 electrolyte solution
50 membrane electrode joint
51 anode-side catalyst layer
52 cathode-side catalyst layer
53 gas diffusion layer
54a, 54b separator
60 single cell
61 current collector
61a current collecting terminal
62 insulating plate
63 end plate
70 stack
71 fuel processor
72 anode humidifier
73 cathode humidifier
74a, 74b, 74c pump
75 heat exchanger
76 hot water tank
80 operation controller
81 power output unit
90 fuel gas
91 oxidizer gas
92 coolant

The invention claimed is:

1. An electrolyte membrane for a solid polymer-type fuel cell, the electrolyte membrane comprising a reinforcing membrane of a nonwoven fabric composed of bicomponent fibers and a first electrolyte material filling voids of the reinforcing membrane,
wherein the bicomponent fibers have a cross section structure that is a sea-island structure including fibers and a second electrolyte material filling voids of the fibers, the bicomponent fibers containing pores in the sea of the second electrolyte material,
the second electrolyte material is a perfluorocarbon polymer having a sulfonic group, and
the fibers are composed of one of a polyvinylidene fluoride polymer, a polyvinylfluoride polymer, a copolymer composed of multiple monomer units constituting a polymer selected from a polyvinylidene fluoride polymer and a polyvinylfluoride polymer, and a mixture of these polymers.

2. The electrolyte membrane for a solid polymer-type fuel cell according to claim 1, wherein the bicomponent fibers have an average fiber diameter of 0.01 μm to 1 μm.

3. The electrolyte membrane for a solid polymer-type fuel cell according to claim 1, wherein the first electrolyte material is a perfluorocarbon polymer.

4. The electrolyte membrane for a solid polymer-type fuel cell according to claim 1, wherein the first electrolyte material may have an identical composition to the perfluorocarbon polymer constituting the reinforcing membrane or a different composition therefrom.

5. The electrolyte membrane for a solid polymer-type fuel cell according to claim 1, wherein an outermost layer of at least one surface of the electrolyte membrane may have the exposed reinforcing membrane or may be covered with the perfluorocarbon polymer.

6. A solid polymer-type fuel cell comprising at least one stacked single cell including the electrolyte membrane for a solid polymer-type fuel cell according to claim 1 and a pair of separators disposed with the electrolyte membrane sandwiched between the separators.

7. A method for producing an electrolyte membrane for a solid polymer-type fuel cell, the method comprising the steps of:
spinning, by electrospinning, a mixed solution of a second electrolyte material, a polyvinylidene fluoride polymer (hereinafter, will be called PVDF), a polyvinylfluoride polymer (hereinafter, will be called PVF), a copolymer composed of multiple monomer units constituting a polymer selected from PVDF and PVF, a mixture of these polymers, and a solvent;
fabricating bicomponent fibers in a sea-island structure including fibers and the second electrolyte material filling voids of the fibers, the bicomponent fibers containing pores in the sea of the second electrolyte material;
forming a reinforcing membrane of a nonwoven fabric by extending the bicomponent fibers into a wavy shape; and
filling voids in the reinforcing membrane with a first electrolyte material.

8. The method for producing an electrolyte membrane for a solid polymer-type fuel cell according to claim 7, wherein the first electrolyte material and the second electrolyte material are perfluorocarbon polymers having sulfonic groups.

* * * * *